United States Patent [19]

Alanko et al.

[11] 4,348,533

[45] Sep. 7, 1982

[54] PREPARATION OF LINEAR POLYDIMETHYLSILOXANES

[75] Inventors: Allan M. Alanko; David R. Salverson, both of Carrollton, Ky.

[73] Assignee: Dow Corning Corporation, Midland, Mich.

[21] Appl. No.: 310,546

[22] Filed: Oct. 13, 1981

[51] Int. Cl.³ ............................ C07F 7/08; C07F 7/18
[52] U.S. Cl. .................................... 556/457; 556/459
[58] Field of Search ............................... 556/457, 459

[56] References Cited

U.S. PATENT DOCUMENTS 4,108,882  8/1978  Mahone ................................ 556/460

Primary Examiner—Paul F. Shaver
Attorney, Agent, or Firm—Jack E. Moermond

[57] ABSTRACT

High yields of linear dimethylpolysiloxanes are obtained by reacting dimethyldichlorosilane with methanol in contact with certain quarternary ammonium halides, such as methyl pyridinium chloride, at a pressure of 15 to 100 psi.

4 Claims, No Drawings

PREPARATION OF LINEAR POLYDIMETHYLSILOXANES

BACKGROUND OF THE INVENTION

The primary commercial method to date of preparing organopolysiloxanes is by the hydrolysis of the corresponding chlorosilanes. This method gives excellent yields of both cyclic and linear polysiloxanes but it involves handling aqueous hydrochloric acid. Since it is necessary to convert the hydrochloric acid to methyl chloride, the process is more complicated than is desired. It would be highly desirable, therefore, to be able to react the chlorosilanes directly with a material producing methyl chloride and thus avoiding the handling of aqueous acid.

U.S. Pat. No. 4,108,882 discloses and claims such a method. This involves reacting dimethyldichlorosilane or trimethylmonochlorosilane with methanol in the presence of certain quaternary ammonium catalysts. The products are primarily cyclic polysiloxanes and methyl chloride which contains a very low percentage of dimethyl ether.

The primary objective of said patent was to produce cyclic polydimethylsiloxanes as set forth in column 1, line 45. Therefore, the patent stresses the use of atmospheric pressure. However, in column 38, the patentee also says that the reaction "may be carried out under conditions below, at or above atmospheric." There is no teaching in the patent that super atmospheric pressure would change the product balance between cyclic and linear siloxanes. In fact, the clear import is that no change would occur. Thus, while carrying out the process at super atmospheric pressure would constitute an infringement of the claims of said patent, there is nothing in the patent to indicate that one seeking a high yield of linear polysiloxanes by reacting methylchloride with dimethyldichlorosilane would find the answer by operating at super atmospheric pressure.

In commercial operation it is often desirable to produce a high proportion of linear siloxanes at the same time that cyclic siloxanes are being produced. This is true because many siloxane products require linear siloxane raw materials.

The object of this invention is to produce a mixture of linear and cyclic siloxanes containing a high proportion of linear materials without sacrificing the benefits of the aforesaid patent; namely, high methyl chloride production with low dimethyl ether content and excellent yields of siloxane product.

BRIEF DESCRIPTION OF THE INVENTION

This invention relates to a method of producing linear polysiloxanes by the reaction of dimethyldichlorosilane and methanol in contact with a catalyst selected from the group consisting of (1) pyridinium chlorides of the formula

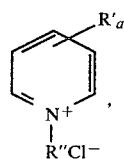

(2) compounds of the formula $R'''_4N^+Cl^-$,

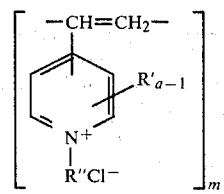

and

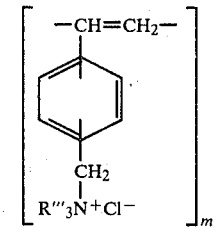

where $R'$ is a hydrocarbon radical having 18 or less carbon atoms; "a" is an integer from 0–5; "m" is an integer greater than 1, $R''$ is a lower alkyl radical; and $R'''$ is selected from the group consisting of methyl, hydroxy alkyl of 2–4 inclusive carbon atoms, aromatic hydrocarbon radicals, and ArCH$_2$— radicals in which Ar is an aromatic hydrocarbon radical there being no more than 18 carbon atoms total in the $R'''$group, the improvement comprising carrying out the reaction at a pressure of from 15 to 100 psi at a temperature of 130° to 170° C. and thereafter separating the dimethylpolysiloxanes so produced from the catalyst.

Any of the catalysts disclosed in the aforesaid U.S. Patent can be employed as a catalyst in this invention. Furthermore, the catalyst can be employed in any physical state as described in said patent, the disclosure of which is hereby incorporated in this application by reference. Thus, the catalyst can be suspended on a carrier but preferably the catalyst is in molten condition. The catalyst can be added to the reactor as such or it can be prepared in situ.

The pressure in the instant case must be between 15 and 100 psi and the pressure/temperature relationship should be such that water can escape from the reaction zone. By regulating the pressure one can vary the cyclic to linear ratio in that the higher the pressure the greater the proportion of linears relative to cyclics.

If desired, some water can be added to the reaction zone in order to increase the proportion of linear siloxanes. This can be conveniently done by recycling to the reaction vessel, the wash water from the siloxanes coming from the reactor.

The ratio of methanol to dimethyldichlorosilane is not critical, however, obviously the best yields of siloxane and methyl chloride will be obtained when the ratio is at least stoichiometric and preferably there is 5 to 10 mol percent excess of methanol based upon the total chlorine in the chlorosilane.

The following example is illustrative only and should not be construed as limiting the invention which is properly delineated in the appended claims. Those skilled in the silicone technology will understand that all of the catalysts within the scope of the present application will operate in this invention as well as the specific catalysts shown in the following example.

EXAMPLE

A series of experiments were carried out under different conditions as shown in the table below. In each case 14.3 gallons of pyridine was added to the reactor and converted to methyl pyridinium chloride by reaction with methyl chloride. In each case liquid dimethyldichlorosilane and methanol vapor were fed separately into the reactor containing the molten catalyst so that the materials passed through the catalyst. The dimethyldichlorosilane was fed at a rate of 71 pounds per hour and the methanol was fed either in stoichiometric amount or in a 5 or 10 mol percent excess of that needed to react with all the chlorine.

In each case cyclic siloxanes distilled from the reactor and the linear siloxanes collected in the reactor from which they were continuously removed, separated from the catalyst and the latter was returned to the reactor. The amount of cyclic produced in each run can be found by subtracting the percent by weight linears from 100.

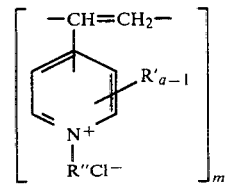

and

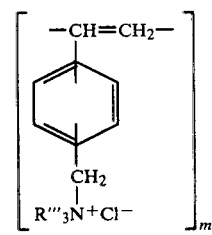

TABLE

| Run No. | Temperature °C. | Pressure psi | Excess Methanol In Mol Percent | Percent By Weight Linears | Chloride* Efficiency In Percent | Percent By Weight Dimethyl Ether In Methyl Chloride |
|---|---|---|---|---|---|---|
| 1 | 150 | 40 | 5 | 31.3 | 99.8 | .33 |
| 2 | 160 | 40 | 0 | 25.6 | 99.4 | .19 |
| 3 | 160 | 40 | 10 | 28.2 | 99.8 | .42 |
| 4 | 160 | 55 | 5 | 33.3 | 99.5 | .28 |
| 5 | 150 | 25 | 5 | 25.5 | 99.4 | .14 |
| 6 | 140 | 40 | 5 | 37.3 | 99.9 | .21 |
| 7 | 150 | 55 | 0 | 52.4 | 98.7 | .16 |

*Represents the percent of total chloride (introduced to the reactor as chlorosilane) which was converted to methyl chloride.

That which is claimed is:

1. In a method of producing linear polysiloxanes by reaction of dimethyldichlorosilane and methanol in contact with a catalyst selected from the group consisting of (1) pyridinium chlorides of the formula

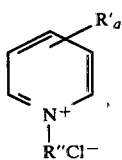

(2) compounds of the formula $R'''_4N^+Cl^-$, where $R'$ is a hydrocarbon radical having 18 or less carbon atoms; "a" is an integer from 0–5; "m" is an integer greater than 1, $R''$ is a lower alkyl radical; and $R'''$ is selected from the group consisting of methyl, hydroxy alkyl of 2–4 inclusive carbon atoms, aromatic hydrocarbon radicals, and ArCH$_2$— radicals in which Ar is an aromatic hydrocarbon radical there being no more than 18 carbon atoms total in the $R'''$ group, the improvement comprising carrying out the reaction at a pressure of from 15 to 100 psi at a temperature of from 130° to 170° C. and thereafter separating the dimethylpolysiloxane so produced from the catalyst.

2. The method of claim 1 in which the catalyst is in the molten condition.

3. The method of claim 2 in which the catalyst is methylpyridinium chloride.

4. The method of claims 1, 2, and 3 in which the methanol is employed in amount of from 5 to 10 mol percent excess.

UNITED STATES PATENT AND TRADEMARK OFFICE
CERTIFICATE OF CORRECTION

PATENT NO. : 4,348,533

DATED : September 7, 1982

INVENTOR(S) : A. M. Alanko & D. R. Salverson

It is certified that error appears in the above—identified patent and that said Letters Patent is hereby corrected as shown below:

In the ABSTRACT, line 3; the line reading "nol in contact with certain quarternary ammonium ha-" should read "nol in contact with certain quaternary ammonium ha-"

Signed and Sealed this

Twenty-ninth Day of March 1983

[SEAL]

Attest:

GERALD J. MOSSINGHOFF

Attesting Officer

Commissioner of Patents and Trademarks